United States Patent
Bridge et al.

(10) Patent No.: US 9,018,931 B2
(45) Date of Patent: Apr. 28, 2015

(54) CONTROL SYSTEM FOR PROVIDING CIRCUIT PROTECTION TO A POWER SUPPLY

(71) Applicant: Solidstate Controls, LLC, Columbus, OH (US)

(72) Inventors: Matthew Bridge, Troy, OH (US); Amuliu Bogdan Proca, Columbus, OH (US); Thomas Bolka, Xenia, OH (US)

( * ) Notice: Subject to any disclaimer, the term of this patent is extended or adjusted under 35 U.S.C. 154(b) by 0 days.

(21) Appl. No.: 14/132,993

(22) Filed: Dec. 18, 2013

(65) Prior Publication Data

US 2014/0167727 A1   Jun. 19, 2014

Related U.S. Application Data

(60) Provisional application No. 61/739,695, filed on Dec. 19, 2012.

(51) Int. Cl.
*H02M 1/36* (2007.01)
*H02J 7/00* (2006.01)

(52) U.S. Cl.
CPC ............ *H02M 1/36* (2013.01); *H02J 7/0031* (2013.01)

(58) Field of Classification Search
CPC ................................ H02M 1/36; H02J 7/0031

USPC .................................................... 323/311, 901
See application file for complete search history.

(56) References Cited

U.S. PATENT DOCUMENTS

| | | | |
|---|---|---|---|
| 2009/0237854 A1* | 9/2009 | Mok et al. ..................... | 361/111 |
| 2010/0066336 A1* | 3/2010 | Araki et al. ................... | 323/284 |
| 2010/0284116 A1* | 11/2010 | Yoshizawa ................... | 361/91.3 |
| 2012/0043950 A1* | 2/2012 | Truong et al. ................ | 323/282 |

* cited by examiner

*Primary Examiner* — Emily P Pham
(74) *Attorney, Agent, or Firm* — James R. Eley; Eley Law Firm Co., LPA

(57) ABSTRACT

A power control system includes a first switch configured to receive electrical power from a power source and selectably provide the electrical power to a load. A current limiter is intermediate the first switch and the load. A second switch is also configured to receive electrical power from the power source and selectably provide electrical power to the load. The power control system includes a soft-start operating mode wherein the first switch is activated to provide the electrical power to the load, current provided to the load being limited by the current limiter. The second switch is also activated to provide the electrical power to the load, the second switch being activated a predetermined period of time after activation of the first switch. The first and second switches are also deactivated while the voltage of the power source exceeds a predetermined level.

18 Claims, 2 Drawing Sheets

CONTROL SYSTEM FOR PROVIDING CIRCUIT PROTECTION TO A POWER SUPPLY

This application claims priority to U.S. provisional application 61/739,695, filed Dec. 19, 2012, the contents of which are hereby incorporated by reference.

FIELD

The present invention relates generally to a power control system usable with power conversion devices such as battery chargers, in particular high-frequency battery chargers.

BACKGROUND

High-frequency (HF) power converters such as battery chargers are prone to exposure to high-voltage transients. Some of the most extreme voltage transients are present during initial power-up of the charger, particularly when the charger is supplied from a power source having a relatively high line inductance. These voltage transients can often exceed the maximum voltage ratings of power switching devices of the charger, such as insulated gate bipolar transistors (IGBTs) and metal oxide semiconductor field effect transistors (MOSFETs). Exceeding the voltage ratings of these devices can damage them, and also other components of the battery charger. The typical solution to avoid such damage is to either add a transformer or an electromagnetic interference (EMI) filter in-line with the charger's power circuit. While both of these solutions aid to reduce the magnitude of voltage transients, they do not provide a solution for all transient and over-voltage conditions. Metal oxide varistors (MOVs) are also commonly employed to suppress voltage transients. However, MOVs typically do not have accurate enough voltage ratings to reliably protect the aforementioned switching devices during voltage transient conditions. There remains a need to more effectively protect power converters from transient voltages, as well as other over-voltage conditions.

SUMMARY

A power control system is disclosed. The power control system senses voltage provided by a power source and quickly disconnects a load (such as a battery charger) from the power source when a transient or a sustained over-voltage condition is present. The power control system is also configured to pass most of the voltage from the power source to the load under normal operating conditions, thereby minimizing the amount of power lost in the power control system as heat dissipation. This minimal power consumption contributes to good power conversion efficiency for loads such as a battery charger when the power control system is incorporated with the load. The power control system has a relatively fast response and thus is able to react to fast voltage transients. A "soft-start" pre-charge operating mode of the present invention reduces or eliminates exposure of the load to power-up voltage transients resulting from line inductances.

One aspect of the present invention is a power control system that includes a first switch configured to receive electrical power from a power source and selectably provide the electrical power to a load. A current limiter is intermediate the first switch and the load. A second switch is also configured to receive electrical power from the power source and selectably provide electrical power to the load. The power control system includes a soft-start operating mode wherein the first switch is activated to provide the electrical power to the load, current provided to the load being limited by the current limiter. The second switch is also activated to provide the electrical power to the load, the second switch being activated a predetermined period of time after activation of the first switch.

Another aspect of the present invention is a power control system that includes a first switch configured to receive electrical power from a power source and selectably provide the electrical power to a load. A first voltage comparator has a first input, a second input and an output, the output of the first voltage comparator being configured to selectably activate the first switch. A current limiter is arranged intermediate the first switch and the load. A second switch is configured to receive electrical power from a power source and selectably provide the electrical power to a load. A second voltage comparator having a first input, a second input and an output, the output of the second voltage comparator is configured to selectably activate the second switch. The power control system includes a soft-start operating mode wherein the first switch is activated by the first voltage comparator to provide the electrical power to the load, current provided to the load being limited by the current limiter. The second switch is activated by the second voltage comparator to provide the electrical power to the load, the second switch being activated a predetermined period of time after activation of the first switch.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
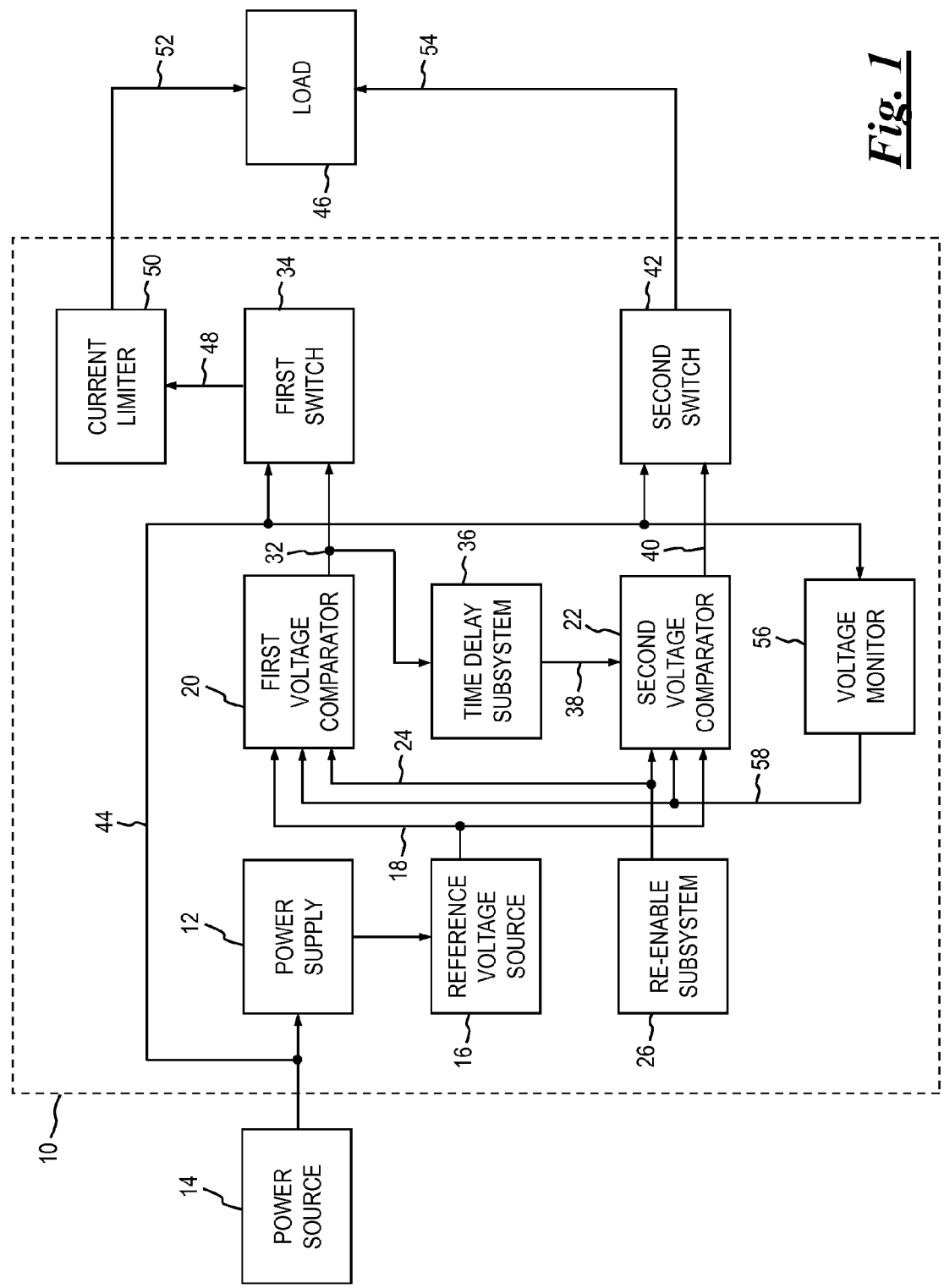
FIG. 1 is a schematic block diagram of a power control system according to an embodiment of the present invention.

The general arrangement of a power control system 10 is shown in FIG. 1 according to an embodiment of the present invention. Power control system 10 includes a power supply 12 that receives electrical power from a power source 14 and provides electrical power to various components and subsystems of power control system 10. A reference voltage source 16 is coupled to power supply 12 and generates a reference voltage 18 that is coupled to a first voltage comparator 20 and a second voltage comparator 22. First voltage comparator 20 also receives a re-enable signal 24 from a re-enable subsystem 26.

First voltage comparator 20 is configured to generate a first output signal 32, which is coupled to a first switch 34 to control activation of the first switch. First output signal 32 is also coupled to a time delay subsystem 36. A time-delayed first output signal 32, numbered 38 in FIG. 1, is provided to second voltage comparator 22 by time delay subsystem 36 after a predetermined period of time has elapsed. A second output signal 40, generated by second voltage comparator 22, is provided to a second switch 42 to control activation of the second switch.

First switch 34 selectably provides electrical power 44 from power source 14 to a load 46 in the form of switched electrical power 48, which is current-limited by a current limiter 50 arranged intermediate the first switch and the load to provide current-limited, switched electrical power 52 to the load. Second switch 42 likewise selectably provides electrical power 44 from power source 14 to load 46, in the form of switched electrical power 54. Unlike switched electrical power 48, switched electrical power 54 is not current-limited.

In operation of power control system 10, during a start-up condition of the power control system, electrical power 44 is initially provided to power supply 12 by power source 14. Power supply 12 begins providing power to various components and subsystems of power control system 10. Reference voltage 18 is generated from power supply 12 and is provided to a first input of first voltage comparator 20 and to a first input of second voltage comparator 22. First voltage comparator 20 provides first output signal 32 to first switch 34 in a state configured to activate the first switch to provide switched electrical power 48 to current limiter 50. Current limiter 50, in turn, limits the current of switched electrical power 48 to provide current-limited electrical power 52 to load 46, thereby deterring high inrush load currents under certain conditions, for example if the load includes a significant amount of input capacitance.

First output signal 32 is also provided to time delay 36. After a predetermined period of time has elapsed time-delayed output signal 38 is provided to a second input of second voltage comparator 22. Second voltage comparator 22 responds to the state of signal 38 by providing second output signal 40 to second switch 42 in a state configured to activate the second switch to provide switched electrical power 54 to load 46. Switched electrical power 54 is not current-limited but is preferably provided to load 46 after the predetermined time delay 36 has elapsed allowing, for example, an input capacitance of load 46 to be at least partially charged by current-limited electrical power 52. Thus, system 10 includes a soft-start operating mode wherein load 46 is initially provided with current-limited electrical power 52 to limit inrush current; the load is provided with non-current-limited electrical power after the time delay 36 has elapsed and the load is preferably sufficiently electrically charged such that inrush currents are limited or eliminated.

In some embodiments of the present invention a voltage monitor 56 monitors the voltage level of electrical power 44 provided by power source 14. In the event that electrical power 44 exceeds a predetermined voltage threshold or level an over-voltage signal 58 is generated by voltage monitor 56 and provided to first voltage comparator 20, causing the first voltage comparator to change the state of first output signal 32 provided to first switch 34 such that the first switch is deactivated, thereby disconnecting switched electrical power 52 from load 46. Voltage monitor 56 likewise provides, either directly or indirectly, over-voltage signal 58 to second voltage comparator 22, causing the second voltage comparator to change the state of second output signal 40 provided to second switch 42 such that the second switch is deactivated, thereby disconnecting switched electrical power 54 from load 46. Load 46 is thus electrically isolated from power source 14 for so long as electrical power 44 exceeds a predetermined voltage threshold or level. Once the voltage of electrical power 44 drops below the predetermined threshold or level power control system 10 is re-enabled by re-enable signal 24 of re-enable subsystem 26 and the aforementioned soft-start operating mode start-up process is again initiated.

A summary of the operation of power control system under various operating conditions is shown in Table 1, below:

TABLE 1

| Power Control System 10 Operating Condition | State of First Switch 34 | State of Second Switch 42 | Power to Load 46 |
| --- | --- | --- | --- |
| Start-Up/Power-Up | ACTIVATED | DEACTIVATED | CURRENT-LIMITED |
| Normal Operation | ACTIVATED | ACTIVATED | NON-CURRENT LIMITED |
| During Over-Voltage Condition of Power Source 14 | DEACTIVATED | DEACTIVATED | OFF |
| Immediately Following Correction of Over-Voltage Condition of Power Source 14 | ACTIVATED | DEACTIVATED | CURRENT-LIMITED |
| Power Source 14 Off or Disconnected From Power Control System 10 | DEACTIVATED | DEACTIVATED | OFF |

Figure 2:
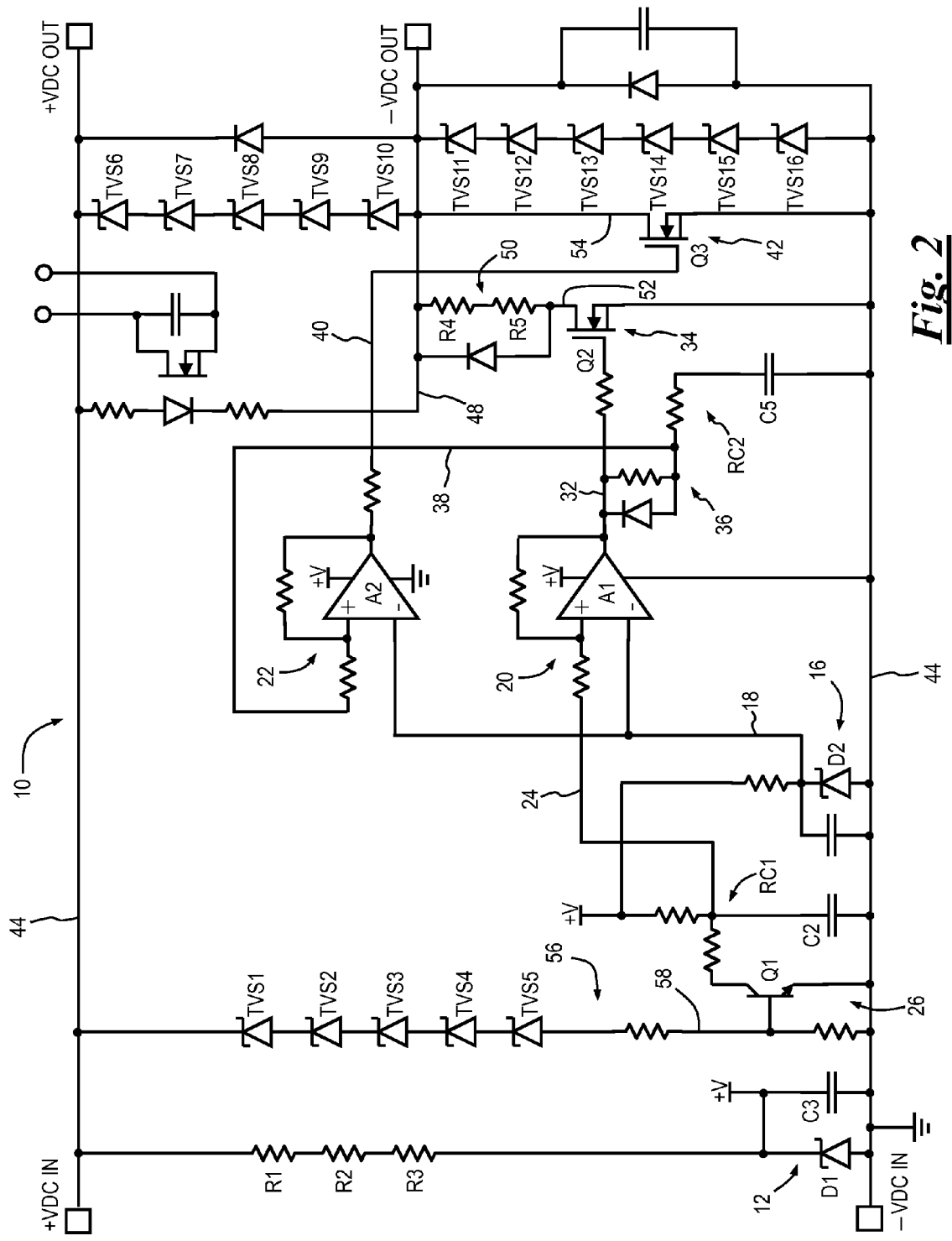
FIG. 2 is an electrical schematic diagram of a power control system according to an embodiment of the present invention.

With continued reference to FIG. 1, an example realization of power control system 10 is shown in FIG. 2 according to an embodiment of the present invention. Input power 44 from power source 14 (FIG. 1) is received at a pair of input terminals labeled +VDC IN and −VDC IN, while controlled output power to load 46 is provided by power control system 10 to a pair of output terminals labeled +VDC OUT and −VDC OUT. In one arrangement of power control system 10 the +VDC OUT and −VDC OUT terminals are electrically coupled to a load 46 such as power converter, for example a high-frequency battery charger. A power-input portion of such a power converter frequently includes input capacitors and voltage-conversion switching devices that are coupled to the +VDC OUT and −VDC OUT terminals of power control system 10.

Power supply 12 of power control system 10 includes a zener diode D1 configured as a shunt voltage regulator to provide a source of electrical power "+V" to the various components and subsystems of the power control system. In one embodiment of the present invention the current level of power supply 12 is preferably set several hundred microamps higher than the load imposed upon the power supply by power control system 10. In one embodiment the power dissipation of a dropping resistance R1, R2, R3 of power supply 12 is about 2.5 watts with normal DC input voltage of power source 14 coupled to input terminals +VDC IN and −VDC IN.

Output +V of power supply 12 (i.e., across a capacitor C3) is provided to a zener diode D2 of a reference voltage source 16 to generate a zener-based reference voltage 18 that is supplied to an input of a first operational amplifier A1 and to an input of a second operational amplifier A2.

A re-enable subsystem 26 to monitor the status of power source 14 includes a first resistor-capacitor ("RC") network RC1 that is coupled to a transistor Q1. Preferably, network RC1 has a relatively long time constant. Transistor Q1 is in turn coupled to a string of high-voltage transient suppressors, TVS1, TVS2, TVS3, TVS4 and TVS5, that are coupled to electrical power 44. Transistor Q1 is configured to generate a reset/re-enable signal 24 of re-enable subsystem 26 in conjunction with a capacitor C2 of first RC network RC1, as detailed further below.

First operational amplifier A1 is configured as a voltage comparator, monitoring the re-enable voltage 24 of first RC network RC1 and turning "on," providing an appropriate output voltage signal 32 when the re-enable voltage (e.g., the voltage of capacitor C2) exceeds the voltage of reference voltage 18. The output of first operational amplifier A1 drives a first power-control switch (in this case an insulated-gate bipolar transistor or "IGBT") Q2 having a series resistance R4, R5.

Second operational amplifier A2 drives a second, main IGBT Q3 and is likewise configured as a voltage comparator. Operational amplifier A2 is arranged to monitor time delay 36 comprising a second resistor-capacitor network RC2 that provides a time-delayed signal 38 corresponding to signal 32 of first operational amplifier A1. The delay caused by second RC network RC2 gives the aforementioned input capacitors and voltage-conversion switching devices of a load 46 coupled to the +VDC OUT and −VDC OUT terminals of power control system 10 sufficient time to attain an initial charge before main IGBT Q3 is gated and turned on.

In some embodiments of the present invention one or more passive transient voltage suppressors TVS6, TVS7, TVS8, TVS9 and TVS10 may be placed across the +VDC OUT and −VDC OUT terminals. Likewise, one or more passive transient voltage suppressors TVS11, TVS12, TVS13, TVS14, TVS15 and TVS16 may be placed in parallel with IGBTs Q2, Q3.

In one example embodiment of the present invention the voltage drop across main IGBT Q3 at full power is about 2 volts at a load 46 current of about 12 amps.

In operation, power control system 10 as realized in FIG. 2 provides a relatively slow charge of a load 46 coupled to the +VDC OUT and −VDC OUT terminals such as, for example, the aforementioned input capacitors and voltage-conversion switching devices of a power converter or battery charger, to substantially reduce or eliminate inrush currents and inductive voltage spikes. During initial start-up of power control system 10, voltage from power source 14 (FIG. 1) is provided to input terminals +VDC IN and −VDC IN and power supply 12. Reference voltage 18 is provided to inverting or (−) terminals of voltage comparators A1 and A2, driving the outputs 32, 40 of the voltage comparators A1, A2 respectively to a near-zero low voltage or "output-low" state.

Network RC1 is coupled to a non-inverting or (+) terminal of voltage comparator A1. Once the voltage of capacitor C2 of network RC1 charges to a voltage greater than reference voltage 18, the output of comparator A1 switches to an "output-high" state approximating power supply voltage +V. This provides a gate signal to IGBT Q2, causing Q2 to begin conducting (i.e., to activate or "turn on"). A load 46 connected to positive voltage output terminal +VDC OUT and switched negative output −VDC OUT is thus provided with electrical power 44, a ground path between −VDC OUT and −VDC IN being provided to the load through IGBT Q2. Current flow through load 46 is limited by resistors R4 and R5, which are in series with IGBT Q2, thereby "soft-starting" the load.

Once the output of voltage comparator A1 switches to an "output-high" state a capacitor C5 of second RC network RC2 begins charging, the voltage of capacitor C5 generating time delay signal 38. Time delay signal 38 is coupled to a non-inverting or (+) input of voltage comparator A2. Once the voltage of capacitor C5 of network RC2 charges to a voltage greater than reference voltage 18, the output of comparator A2 switches to an "output-high" state approximating power supply voltage +V. This provides a gate signal to IGBT Q3, causing Q3 to begin conducting (i.e., to activate or "turn on"). The load 46 connected to output terminals +VDC OUT and −VDC OUT is thus provided with electrical power 44, a ground path between −VDC OUT and −VDC IN being provided to the load through IGBT Q3, which is in parallel with the series arrangement of resistors R4 and R5, and IGBT Q2. IGBT Q3 provides a low-resistance ground path between −VDC OUT and −VDC IN and effectively shorts out or bypasses the series arrangement of resistors R4 and R5, and IGBT Q2.

Power control system 10 also senses an over-voltage condition at the power input (+VDC IN and −VDC IN terminals) and responds by turning off IGBTs Q2 and Q3 during the over-voltage condition, thus limiting the voltage provided to load 46 by isolating the power converter from the over-voltage. Power control system 10 preferably further protects load 46 from transient voltage conditions and then re-starts the charger before an error condition occurs, that is, before a load so configured reports or records an error condition or sounds an alarm after a period of time has elapsed with no current flowing in the load. Details of this operating mode are provided below.

Under normal post soft-start operating conditions transistors Q1 and Q2 are both activated and conducting as described above. If power source 14 experiences an over-voltage condition or a voltage transient (generally termed "over-voltage") the over-voltage will be presented to input terminals +VDC IN and −VDC IN of power control system 10. The over-voltage will overcome the reverse breakdown rating of transient voltage suppressors TVS1, TVS2, TVS3, TVS4, TVS5, causing a reverse current to flow through the transient voltage suppressors. The reverse current provides a forward biasing current to be presented to the base-emitter junction of transistor Q1. Transistor Q1 begins conducting (i.e., "turns on"), substantially discharging capacitor C2 of network RC1. The voltage at the (+) terminal of voltage comparator A1 is thus reduced below that of reference voltage 18, which is present at the (−) terminal of A1, causing the output of A1 to change to an output-low state and turn off IGBT Q2, thereby removing the ground path between −VDC OUT and −VDC IN through IGBT Q2.

The output-low state of voltage comparator A1 rapidly discharges capacitor C5 of network RC2 through a diode D3, the discharge current of C5 flowing through D3 and into the output of A1. As a result, the voltage 38 at the (+) input terminal of voltage comparator A2 is rapidly reduced below that of reference voltage 18, which is present at the (−) terminal of A2, causing the output of A2 to change to an output-low state and turn off IGBT Q3, thereby removing the ground path between −VDC OUT and −VDC IN through IGBT Q3.

With IGBTs Q2 and Q3 deactivated the load 46 is thus effectively disconnected from the input terminals +VDC IN and −VDC IN while the over-voltage is present at the input terminals. Once the over-voltage condition is removed the transient voltage suppressors TVS1, TVS2, TVS3, TVS4, TVS5 cease conducting the reverse current and transistor Q1 is biased to a non-conducting or "off" state. The aforementioned soft-start operating mode is then initiated to restore power to the load 46.

Power control system 10 preferably has relatively high efficiency, on the order of less than about 0.5% efficiency loss.

In some embodiments of the present invention power control system 10 may utilize series high-voltage IGBTs and relatively high-speed control of the IGBTs to remove power from the output terminals +VDC OUT and −VDC OUT during transient conditions, and also for relatively sustained (e.g., >1 mS) over-voltage conditions. Power control system 10 may further include the aforementioned soft-start operating mode to remove power up-inductive voltage spikes with Q2 configured in series with resistors R4, R5.

In some embodiments of power control system 10 the dynamic resistance of series IGBTs Q2 and/or Q3 may be utilized to control (i.e., limit) fast transients presented at the +VDC IN and −VDC IN terminals before the control circuit logic (i.e., operational amplifiers A1, A2 and associated components) has time to react. The dynamic resistance of the IGBTs is preferably characterized such that the IGBTs respond to transient voltages at the input to power control system 10 such that the voltage dropped across Drain and Source terminals of the conducting IGBTs increases from normal values due to a corresponding transient current flowing through the IGBTs, thereby absorbing some of the energy of the transient. IGBTs Q2 and Q3 are preferably deactivated or turned "off" by power control system 10 in the manner detailed above before the energy absorbed by the IGBTs exceeds their electrical ratings.

While this invention has been shown and described with respect to a detailed embodiment thereof, it will be understood by those skilled in the art that changes in form and detail thereof may be made without departing from the scope of the claims of the invention. For example, the various components and their arrangement in FIG. 2 are presented for the purpose of example and are not intended to be limiting in any way. As is apparent to one skilled in the art, many components may be one or more of integrated, substituted, combined and re-arranged while retaining the functions and characteristics of the power control system described herein. Such integrations, combinations, substitutions and re-arrangements are thus within the scope of the present invention.

What is claimed is:

1. A power control system, comprising:
a first switch configured to receive electrical power from a power source and selectively provide the electrical power to a load;
a current limiter intermediate the first switch and the load; and
a second switch configured to receive electrical power from the power source and selectively provide electrical power to the load; and
a voltage monitor to monitor a voltage of the power source, the first switch and the second switch being deactivated while the voltage exceeds a predetermined level;
the power control system further including a soft-start operating mode wherein:
the first switch is activated to provide the electrical power to the load, current provided to the load being limited by the current limiter, and
the second switch is activated to provide the electrical power to the load, the second switch being activated a predetermined period of time after activation of the first switch.

2. The power control system of claim 1 wherein the soft-start operating mode is initiated when the electrical power from the power source is initially provided to the power control system.

3. The power control system of claim 1 wherein the soft-start operating mode is initiated when the voltage from the power source falls below the predetermined level.

4. The power control system of claim 1, further comprising a first voltage comparator configured to selectively activate the first switch.

5. The power control system of claim 1, further comprising a second voltage comparator configured to selectively activate the second switch.

6. The power control system of claim 1 wherein the current limiter comprises at least one resistor.

7. The power control system of claim 1 wherein at least one of the first switch and the second switch is configured with a dynamic resistance, the dynamic resistance limiting energy applied to the load by voltage transients.

8. A power control system, comprising:
a first switch configured to receive electrical power from a power source and selectively provide the electrical power to a load;
a first voltage comparator having a first input, a second input and an output, the output of the first voltage comparator being configured to selectively activate the first switch;
a current limiter intermediate the first switch and the load;
a second switch configured to receive electrical power from the power source and selectively provide the electrical power to the load;
a second voltage comparator having a first input, a second input and an output, the output of the second voltage comparator being configured to selectively activate the second switch; and
a re-enable voltage, the re-enable voltage being coupled to the second input of the first voltage comparator, and
a state of the re-enable voltage being selectively varied in a predetermined manner corresponding to a status of the power source;
the power control system further including a soft-start operating mode wherein:
the first switch is activated by the first voltage comparator to provide the electrical power to the load, current provided to the load being limited by the current limiter, and
the second switch is activated by the second voltage comparator to provide the electrical power to the load, the second switch being activated a predetermined period of time after activation of the first switch.

9. The power control system of claim 8, further including a positive voltage output, a ground, and a switched negative output selectively coupled to the ground.

10. The power control system of claim 9, further including at least one transient voltage suppressor connected between the positive voltage output and the switched negative output.

11. The power control system of claim 8, further comprising a reference voltage coupled to the first input of the first and second voltage comparators.

12. The power control system of claim 8, further including a time delay subsystem,
the output of the first voltage comparator being coupled to the second input of the second voltage comparator through the time delay subsystem,
a state of the output of the second voltage comparator being configured to correspond with a state of the output of the first voltage comparator after a predetermined time delay period when the output of the first voltage comparator changes from an output-low state to an output-high state, and
the state of the output of the second voltage comparator being configured to rapidly correspond with the state of the output of the first voltage comparator when the output of the first voltage comparator changes from the output-high state to the output-low state.

13. The power control system of claim 8, further including at least one transient voltage suppressor connected in parallel with at least one of the first switch and the second switch.

14. The power control system of claim 8 wherein at least one of the first switch and the second switch is configured with a dynamic resistance, the dynamic resistance limiting energy applied to the load by voltage transients.

15. A method for controlling supply of power to a load, comprising the steps of:
   configuring a first switch to:
      receive electrical power from a power source, and
      selectively provide the electrical power to the load;
   connecting a current limiter intermediate the first switch and the load;
   configuring a second switch to:
      receive electrical power from the power source, and
      selectively provide electrical power to the load; and
   monitoring a voltage of the power source, the first switch and the second switch being deactivated while the voltage exceeds a predetermined level; and
   configuring a soft-start operating mode wherein:
      the first switch is activated to provide the electrical power to the load, current provided to the load being limited by the current limiter, and
      the second switch is activated to provide the electrical power to the load, the second switch being activated a predetermined period of time after activation of the first switch.

16. The method of claim 15, further including the step of initiating the soft-start operating mode when the electrical power from the power source is initially provided to the first switch and the second switch.

17. The method of claim 15, further including the step of initiating the soft-start operating mode when the voltage from the power source falls below the predetermined level.

18. A power control system, comprising:
   a first switch configured to receive electrical power from a power source and selectively provide the electrical power to a load;
   a first voltage comparator having a first input, a second input and an output, the output of the first voltage comparator being configured to selectively activate the first switch;
   a current limiter intermediate the first switch and the load;
   a second switch configured to receive electrical power from a power source and selectively provide the electrical power to a load;
   a second voltage comparator having a first input, a second input and an output, the output of the second voltage comparator being configured to selectively activate the second switch; and
   a time delay subsystem,
   the output of the first voltage comparator being coupled to the second input of the second voltage comparator through the time delay subsystem,
   a state of the output of the second voltage comparator being configured to correspond with the state of the output of the first voltage comparator after a predetermined time delay period when the output of the first voltage comparator changes from an output-low state to an output-high state, and
   a state of the output of the second voltage comparator being configured to rapidly correspond with the state of the output of the first voltage comparator when the output of the first voltage comparator changes from an output-high state to an output-low state;
   the power control system including a soft-start operating mode wherein:
      the first switch is activated by the first voltage comparator to provide the electrical power to the load, current provided to the load being limited by the current limiter, and
      the second switch is activated by the second voltage comparator to provide the electrical power to the load, the second switch being activated a predetermined period of time after activation of the first switch.

* * * * *